(12) United States Patent
Duzett et al.

(10) Patent No.: US 8,032,650 B2
(45) Date of Patent: Oct. 4, 2011

(54) MEDIA STREAM DISTRIBUTION SYSTEM

(75) Inventors: Robert C. Duzett, Hillsboro, OR (US);
Sydney D. Lovely, Beaverton, OR (US);
Darin J. Klaas, Beaverton, OR (US);
Steven R. Page, Hillsboro, OR (US)

(73) Assignee: ARRIS Group, Inc., Suwanee, GA (US)

( * ) Notice: Subject to any disclaimer, the term of this patent is extended or adjusted under 35 U.S.C. 154(b) by 380 days.

(21) Appl. No.: 12/002,343

(22) Filed: Dec. 12, 2007

(65) Prior Publication Data
US 2008/0189382 A1    Aug. 7, 2008

(51) Int. Cl.
*G06F 15/16* (2006.01)
(52) U.S. Cl. .......................... 709/231; 709/205
(58) Field of Classification Search .................. 709/205, 709/201, 231
See application file for complete search history.

(56) References Cited

U.S. PATENT DOCUMENTS

| | | |
|---|---|---|
| 4,371,929 A | 2/1983 | Brann |
| 4,394,733 A | 7/1983 | Swenson |
| 4,476,526 A | 10/1984 | Dodd |
| 4,920,478 A | 4/1990 | Furuya |
| 4,977,495 A | 12/1990 | Stratton |
| 5,289,581 A | 2/1994 | Berenguel |
| 5,535,116 A | 7/1996 | Gupta |
| 5,835,942 A | 11/1998 | Putzolu |
| 5,860,101 A | 1/1999 | Arimilli |
| 5,893,163 A | 4/1999 | Arimilli |
| 5,933,603 A | 8/1999 | Vahalia |
| 6,061,504 A | 5/2000 | Tzelnic |
| 6,370,614 B1 | 4/2002 | Teoman |
| 6,370,615 B1 | 4/2002 | Percival |
| 6,463,509 B1 | 10/2002 | Teoman |
| 6,467,022 B1 | 10/2002 | Buckland |
| 6,725,261 B1 * | 4/2004 | Novaes et al. ................. 709/220 |
| 6,785,768 B2 * | 8/2004 | Peters et al. ................... 711/112 |
| 2003/0005457 A1 | 1/2003 | Faibish |
| 2003/0095783 A1 | 5/2003 | Binder |
| 2003/0177305 A1 | 9/2003 | Hetrick |
| 2003/0200388 A1 | 10/2003 | Hetrick |
| 2004/0088557 A1 | 5/2004 | Malcolm et al. |
| 2005/0180415 A1 | 8/2005 | Cheung et al. |
| 2005/0195836 A1 * | 9/2005 | Greenspan et al. ........... 370/401 |
| 2005/0283818 A1 * | 12/2005 | Zimmermann et al. ...... 725/134 |

FOREIGN PATENT DOCUMENTS

WO    WO2005/032057    4/2005

* cited by examiner

*Primary Examiner* — Philip Chea
(74) *Attorney, Agent, or Firm* — Troy A. Van Aacken; Robert J. Starr

(57) ABSTRACT

A media server comprises a plurality of nodes each comprising a gateway, each gateway providing memory and communication of data between mass storage and I/O ports of a node, and/or providing communication of data between the node and other nodes. Each node utilizes one or more central processors. The media server comprises logic to enable the processors to manage the streaming of data from the mass storage to the I/O ports via the gateways without communicating the data between the processors and any of the mass storage, I/O ports, or gateways.

11 Claims, 12 Drawing Sheets

MEDIA STREAM DISTRIBUTION SYSTEM

PRIORITY CLAIM AND CROSS REFERENCE TO RELATED APPLICATIONS

This application claims priority to the PCT application entitled "media stream distribution system", having application number PCT/US06/09189, filed on Wednesday, Mar. 15, 2006.

TECHNICAL FIELD

The present disclosure relates to architectures for scalable information distribution systems.

BACKGROUND

The distribution of digital video, audio, and other forms of complex information presents many design challenges. These challenges arise from the large storage requirements of such information, as well as the high bandwidth and processing requirements to distribute such information.

A high-performance information distribution system may include multiple processors, mass storage components, memories, and input/output components arranged to operate in a parallel (substantially simultaneous) fashion. Such systems, when properly designed, may provide for the simultaneous distribution of multiple high-resolution digital audio/video streams for cable television, the Internet, satellite television, and so on.

One performance limitation in such systems arises from mass storage. Mass storage generally involves large-capacity machine memory devices, such as magnetic and optical disks. Mass storage usually provides for the preservation of information (persistence) even in the absence of power applied to the memory. Mass storage generally provides a lower cost per storage metric than is available with smaller memories that lack persistence. For example, magnetic and optical disks generally provide a lower cost per megabyte, gigabyte, and terabyte of stored information than is available with smaller random access memory (RAM), flash memory, dynamic RAM (DRAM), static RAM (SRAM), and so on. However, mass storage is also generally characterized by slower read/write (access) times than smaller memories.

Cache memory may be provided to partially compensate for the slower read/write times of mass storage. Information of the mass storage that is frequently accessed may be duplicated in a cache memory that is, relative to the mass storage, lower in storage capacity and characterized by lower access times. Cache memories are typically non-persistent.

Various caching schemes are described by United States patents and/or published patent applications having numbers
U.S. Pat. No. 5,835,942
U.S. Pat. No. 6,463,509
U.S. Pat. No. 6,370,614
U.S. Pat. No. 6,370,615
U.S. Pat. No. 5,289,581
20030005457

These patents describe schemes whereby cache memory benefits a particular processing node with which it is associated.

Various caching schemes are also described by United States patents and/or published patent applications having numbers
20030095783
U.S. Pat. No. 6,061,504
U.S. Pat. No. 4,371,929
U.S. Pat. No. 4,977,495
U.S. Pat. No. 4,476,526
U.S. Pat. No. 4,394,733

These patents describe schemes whereby cache memory is globally available to processing nodes of the system.

United States patents and published patent applications having numbers
20030200388
20030177305
U.S. Pat. No. 6,467,022
describe "solid-state disk" memory schemes.

U.S. Pat. No. 4,920,478 describes a mass storage controller having an integrated cache memory.

U.S. Pat. No. 5,933,603 describes a buffering scheme.

U.S. Pat. No. 5,535,116 describes a global distributed memory scheme.

U.S. Pat. Nos. 5,893,163 and 5,860,101 describe a memory partitioning scheme including cache memory.

Global caching schemes tend to be expensive, complicated, and may tend to scale poorly as processing nodes are added to the system. Schemes that associate a cache with a particular processing node (including schemes that integrate a cache memory with a mass storage controller) may forfeit benefits available from underutilized caches on other nodes.

SUMMARY

The following summary is intended to highlight and introduce some aspects of the disclosed embodiments, but not to limit the scope of the claims. Thereafter, a detailed description of illustrated embodiments is presented, which may permit one skilled in the relevant art to make and use various embodiments.

A media server may include and/or involve a first node of at least two nodes including first mass storage, one or more first media output ports, and a first gateway including interface logic and gateway memory, a second node of at least two nodes including second mass storage, one or more second media output ports, and a second gateway including interface logic and gateway memory, one or more processors, and the gateways having data isolation from the processors.

The media server may include and/or involve logic to cause mass storage and gateway memory of the at least two nodes to appear to the processors as a single mass storage volume and system memory, respectively.

The media server may include and/or involve each gateway including logic to determine whether one or more addresses referenced by one or more local processors refers to data stored by non-local gateway memory, and if so, to retrieve the data from the non-local gateway memory.

The media server may include and/or involve the first and second nodes comprised by a single console and including interfaces to nodes of other consoles.

The media server may include and/or involve a direct communication connection between the gateways of the first and second nodes.

The media server may include and/or involve the first and second nodes coupled to a console interface including independent communication channels to multiple nodes of other consoles.

The media server may include and/or involve a pair of independent communication channels in each cable connecting two consoles, each independent communication channel of the pair connecting a pair of nodes.

A media distribution system may include and/or involve nodes organized into console units, nodes in different consoles communicating by way of an external interconnect, and nodes in same consoles communicating via an intra-console interconnect. The nodes and interconnect may, in some embodiments, form a hypercube. The nodes in different consoles communicating by way of an external hypercube interconnect may include and/or involve N nodes in a first console communicating with N nodes in a second console by way of N independent communication channels, where N>=2. The N nodes in a first console communicating with N nodes in a second console by way of N independent communication channels, where N>=2 may include and/or involve the N independent communication channels each between a pair of nodes, and/or the N independent communication channels within a single cable.

The media distribution system may include and/or involve logic to cause mass storage and memory of the nodes of the same and different consoles to appear to processors of each console as a single mass storage volume and system memory, respectively.

Each node may comprise one or more central processors and a data plane comprising mass storage, memory, and I/O, the central processors not part of the data plane. In some embodiments, the I/O and mass storage may comprise embedded processors.

A node of a multi-node system may include and/or involve one or more central processors, one or more memories not coupled to the processors by any data bus (i.e. memories having data isolation from the processors), and the one or more memories acting as a gateway between mass storage, one or more media stream output interfaces, and an interconnect to other nodes of the multi-processor system.

The node of a multi-node system may include and/or involve the processors coupled to one or more processor memories by way of one or more data busses.

The node of a multi-node system may include and/or involve the processors coupled to the mass storage and media stream output interfaces by way of one or more control busses.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Figure 1:
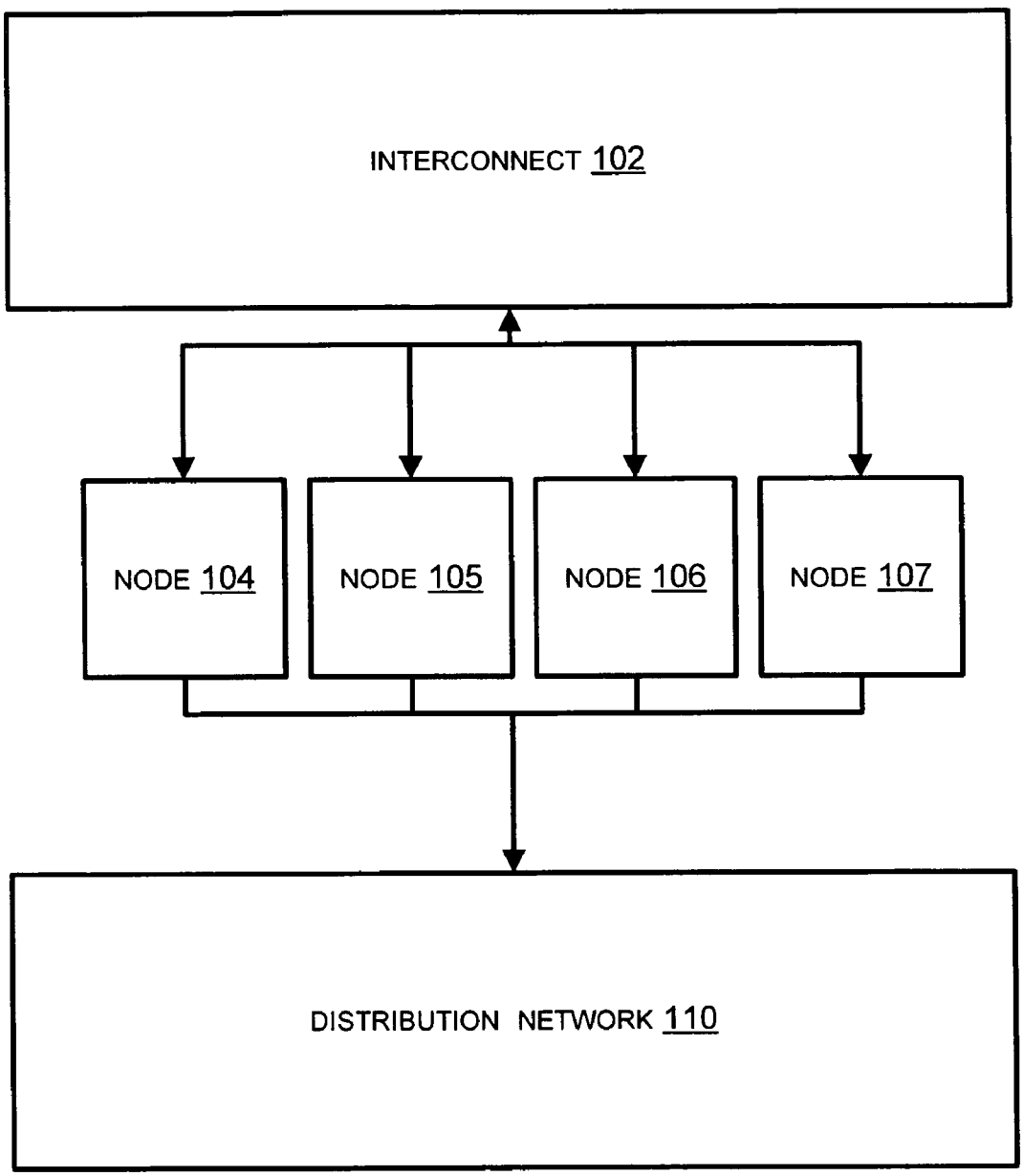
FIG. 1 is a block diagram of an embodiment of an information distribution system having multiple data processing nodes.

FIG. 1 is a block diagram of an embodiment of an information distribution system having multiple data processing nodes. A node is a collection of storage and information processing functionality. To simplify the discussion, various elements are omitted from the description of the nodes, which could possibly include one or more processors, schedulers, arbiters, memories, circuits, busses, interfaces, and so on.

Various data processing nodes 104-107 communicate with one another via an interconnect 102. Within a particular node, elements may communicate "locally" with one another without resort to an interconnect. In other words, inter-node communications takes place via the interconnect 102, and intra-node communications takes place without use of the interconnect 102.

The interconnect 102 may comprise one or more routers, switches, data networks, cross-connects, high-performance busses, and/or other mechanisms for routing electrical and/or optical information. The interconnect routes communication between devices coupled to the interconnect, according to an address or other destination identifier associated with the communication. The data processing nodes 104-107 communicate information, via the interconnect 102, to a data distribution network 110.

Such a system may serve as an audio/video distribution system, where the nodes 104-107 provide the capability for simultaneous delivery of distinct audio/video streams to cable television, Internet, and/or other media distribution networks. The system is readily scalable, because mass storage, cache, and I/O capacity may be increased by including additional data processing nodes.

Figure 2:
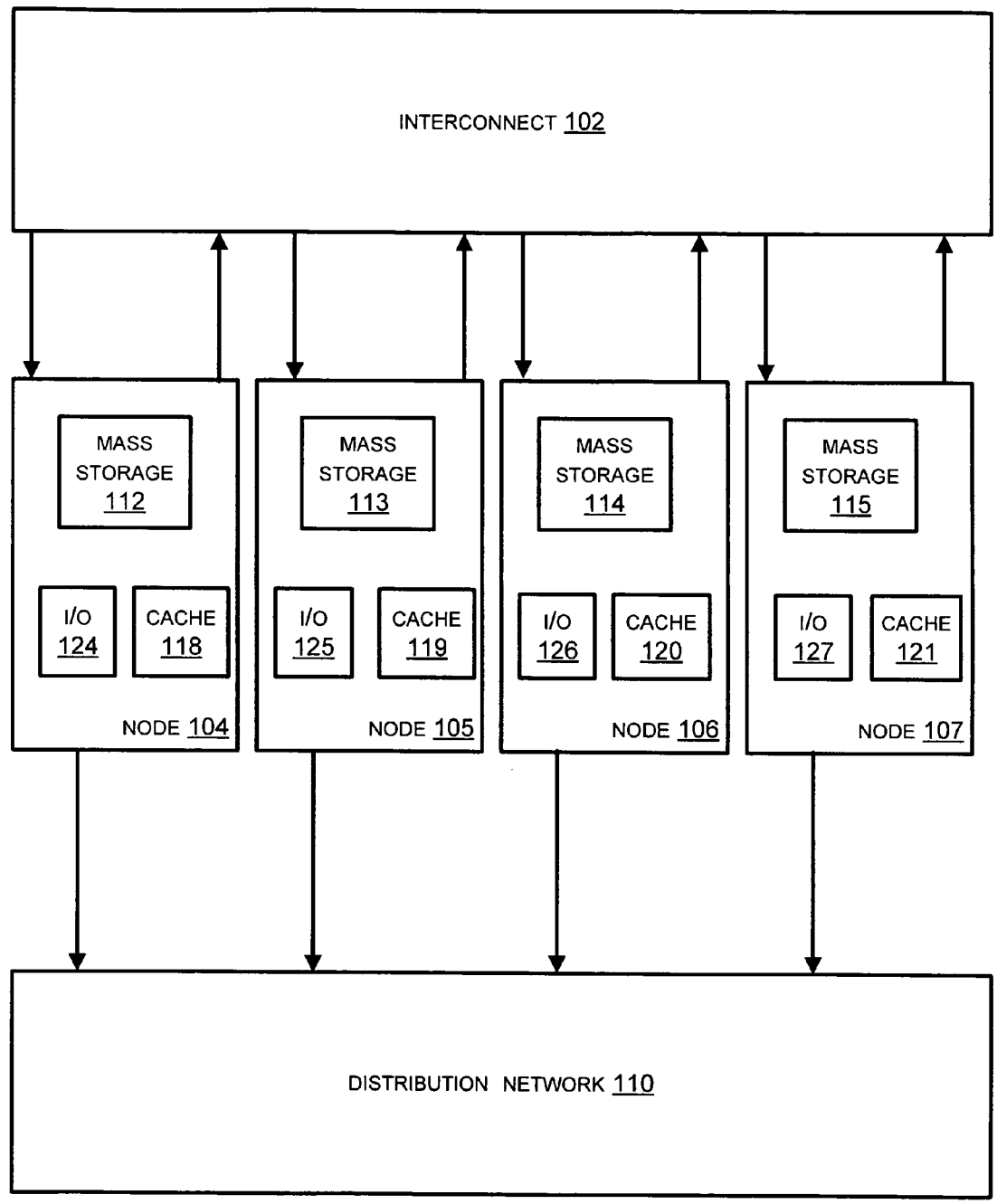
FIG. 2 is a block diagram showing in more detail the nodes of an embodiment of an information distribution system.

FIG. 2 is a block diagram showing in more detail the nodes of an embodiment of an information distribution system. The data processing nodes 104-107 each comprise mass storage, an information cache, and input/output (I/O) functionality.

The term I/O herein is applied to logic that provides, either directly or via intervening stages, information from the information distribution system to an external system (such as the distribution network 110). I/O functionality may also, in some circumstances, receive information from the external system into the distribution system.

In particular, node 104 comprises mass storage 112, cache 118, and I/O 124. Node 105 comprises mass storage 113, cache 119, and I/O 125. Node 106 comprises mass storage 114, cache 120, and I/O 126. Node 107 comprises mass storage 115, cache 121, and I/O 127.

Each node 104-107 is coupled to the interconnect 102 and may via such coupling receive information from mass storage 112-115 and cache 118-121. The I/O 124-127 may receive information from the mass storage and/or cache of the node comprising the I/O, or from the mass storage and/or cache of a different node. Each node 104-107 may provide information from its mass storage and/or cache to other nodes. Information comprised by a mass storage or cache may be referred to as content of the mass storage or cache.

To improve the performance of information delivery, information provided to the interconnect 102 by a particular mass storage may also be provided to the cache associated with the mass storage (e.g. the cache of the node comprising the mass storage). The cache may store a copy of the information, so that future accesses of the information by the I/O 124-127 are accomplished in less time than if such accesses were applied to the mass storage. The cache 118-121 may also access and store information of the mass storage 112-115 in a predictive fashion, before attempts to access such information are made by the I/O 124-127.

Figure 5:
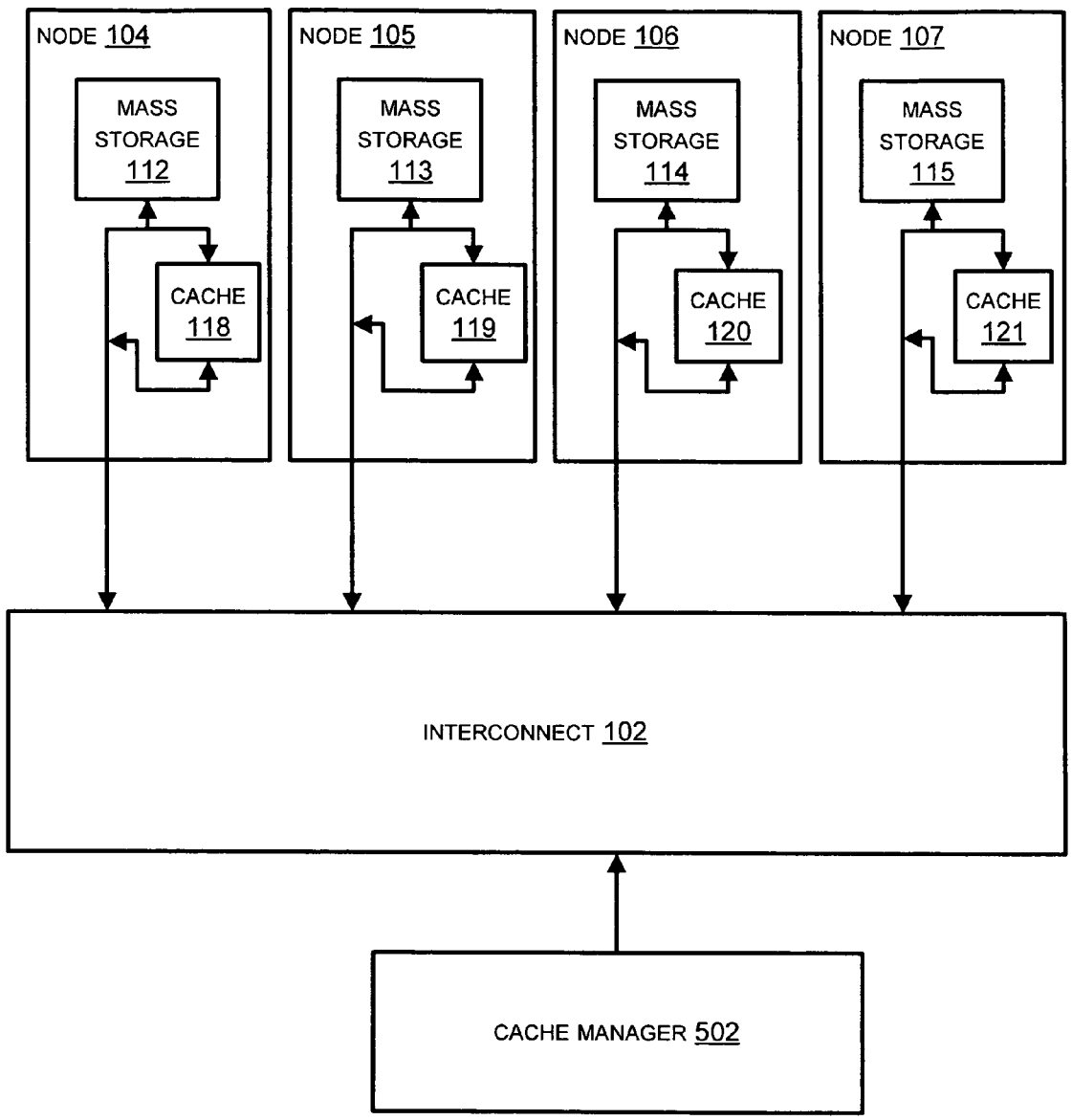
FIG. 5 is a block diagram of an embodiment of a data processing system including cache management.

The contents of a particular cache may be at least partially determined via control signals provided via the interconnect 102, as further described in conjunction with FIG. 5. To improve cache utilization, the contents of the cache 118-121 may be managed so that information is not duplicated between the caches of different nodes. Furthermore, a cache of a particular node may store information from a mass storage of a different node or nodes, benefiting situations where performance may be improved through caching of additional information from the other node or nodes. In other words, the cache 118-121 acts as a globally distributed cache for the content of the mass storage 112-115.

Figure 3:
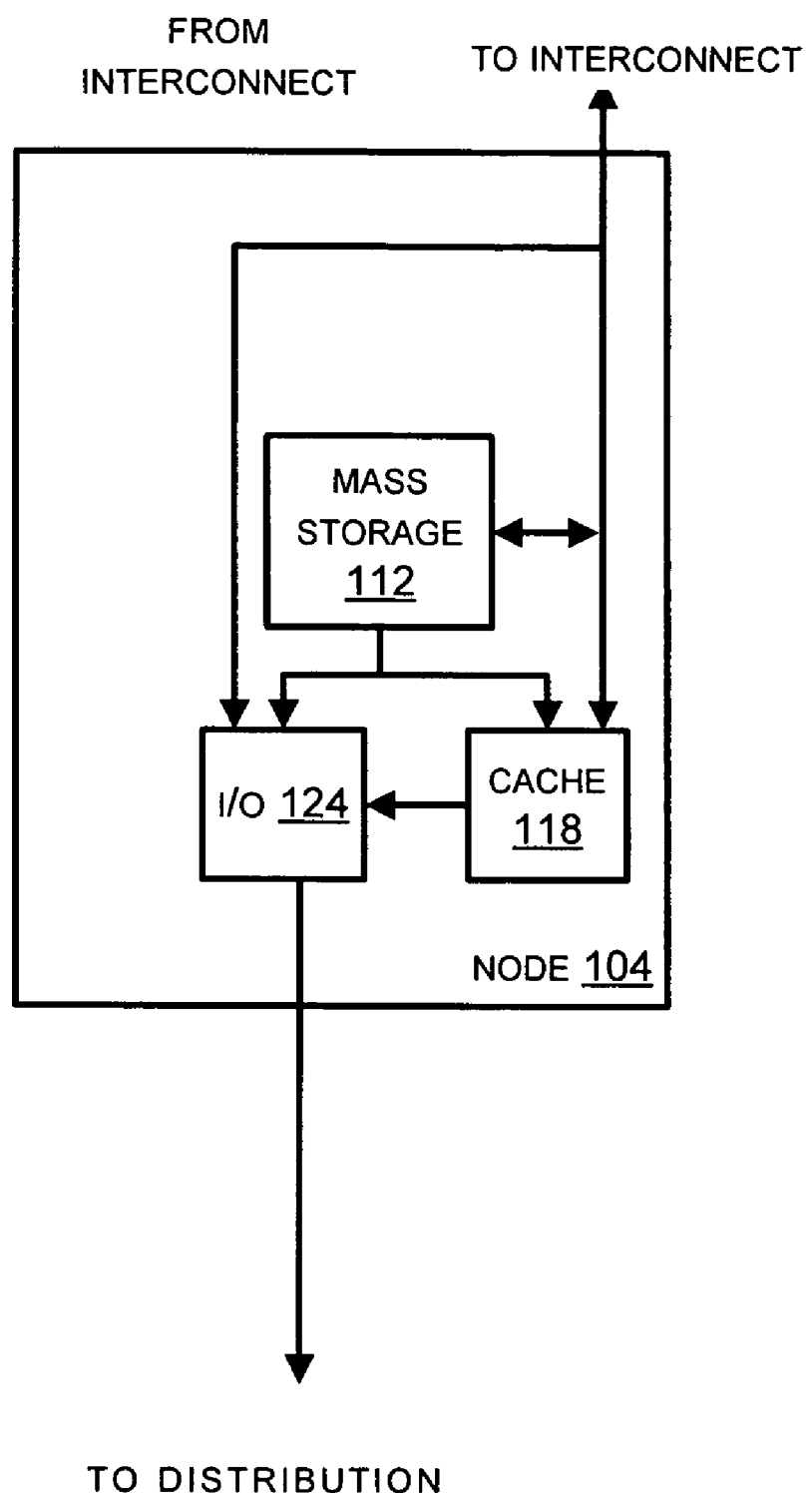
FIG. 3 is a block diagram of an embodiment of a node of a data processing system.

FIG. 3 is a block diagram of an embodiment of a node of a data processing system. The node 104 comprises mass storage 112, cache 118, and I/O 124. The mass storage 112 is coupled to the cache 118 and the I/O 124. The cache 118 is coupled to the I/O 124 and the mass storage 112. The I/O 124 may access, via the interconnect 102, information of another mass storage and/or cache of the system. The I/O 124 may also access information of the mass storage 112 and/or cache 118 "locally", e.g. without communicating the information via the interconnect 102. Bypassing the interconnect 102 in this fashion may improve the performance of information distribution when information accessed by an I/O is content of the same node comprising the I/O.

Figure 4:
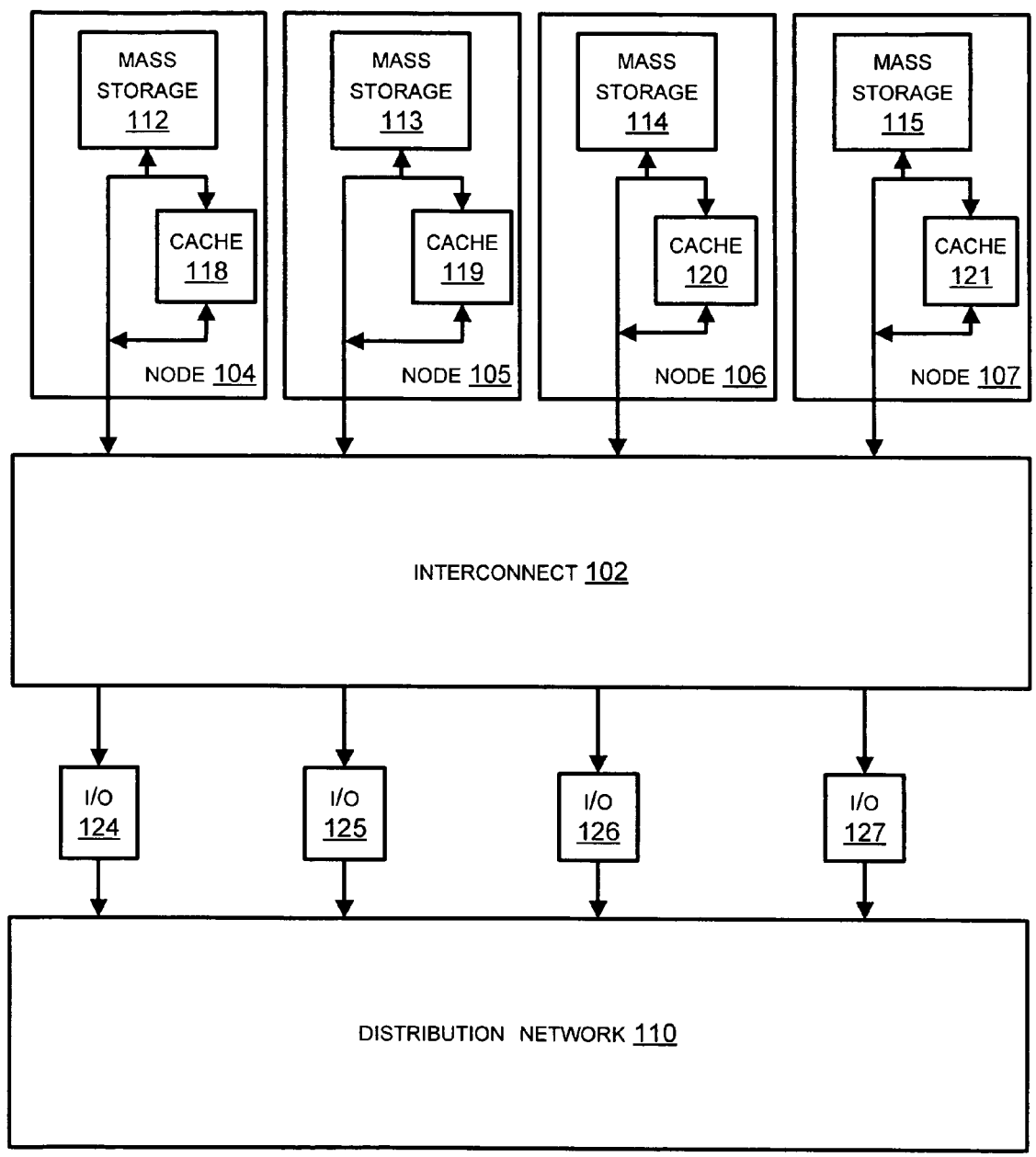
FIG. 4 is a block diagram of an embodiment of a data processing system comprising separate mass storage and I/O nodes.

FIG. 4 is a block diagram of an embodiment of a data processing system comprising separate mass storage and I/O nodes. The nodes 104-107 comprise mass storage and cache functionality. I/O functionality is provided distinctly from mass storage and cache functionality, via I/O logic 124-127. The nodes 104-107 may be referred to as storage nodes, and the I/O 124-127 may be referred to as I/O nodes. Thus, mass storage and cache capacity may be increased by including additional storage nodes. I/O capacity may be increased independently of storage and cache capacity by including additional I/O nodes. The I/O 124-127 accesses information of the mass storage 112-115 and cache 118-121 via the interconnect 102. The cache of a particular storage node may store content from the mass storage of the node comprising the cache, and/or the content of the mass storage of one or more other storage nodes. In other words, the cache 118-121 is available to all storage nodes as a global, distributed cache resource.

FIG. 5 is a block diagram of an embodiment of a data processing system including cache management. The cache 118-121 is coupled to the interconnect 102 in such a manner that information of the cache 118-121 may be accessed by I/O 124-127 via the interconnect 102. Control and/or information access is also provided between the interconnect 102 and the cache 118-121. Cache manager logic 502 is coupled to the interconnect 102 and may influence the contents of the cache 118-121 via the interconnect 102. The cache manager logic 502 may be centralized or distributed throughout the system, for example across multiple nodes. The cache manager logic 502 may reside on one or more "management" nodes.

Other systems may include couplings between the cache manager 502 and the cache 118-121 that do not involve the interconnect 102. In such systems the cache manager 502 may influence the contents of the cache 118-121 without communicating signals and/or information via the interconnect 102.

The cache manager 502 may influence (affect) the contents of the cache 118-121 according to past, present, and/or predicted information distribution demands. For example, information of a particular one of the mass storage 112-115 that is predicted to be in high demand may be stored in multiple ones of the cache 118-121 (without any duplication, or without significant duplication). Information distribution performance may thus be improved through utilization of a global distributed cache resource, while maintaining scalability benefits of modular mass storage, cache, and I/O.

Figure 6:
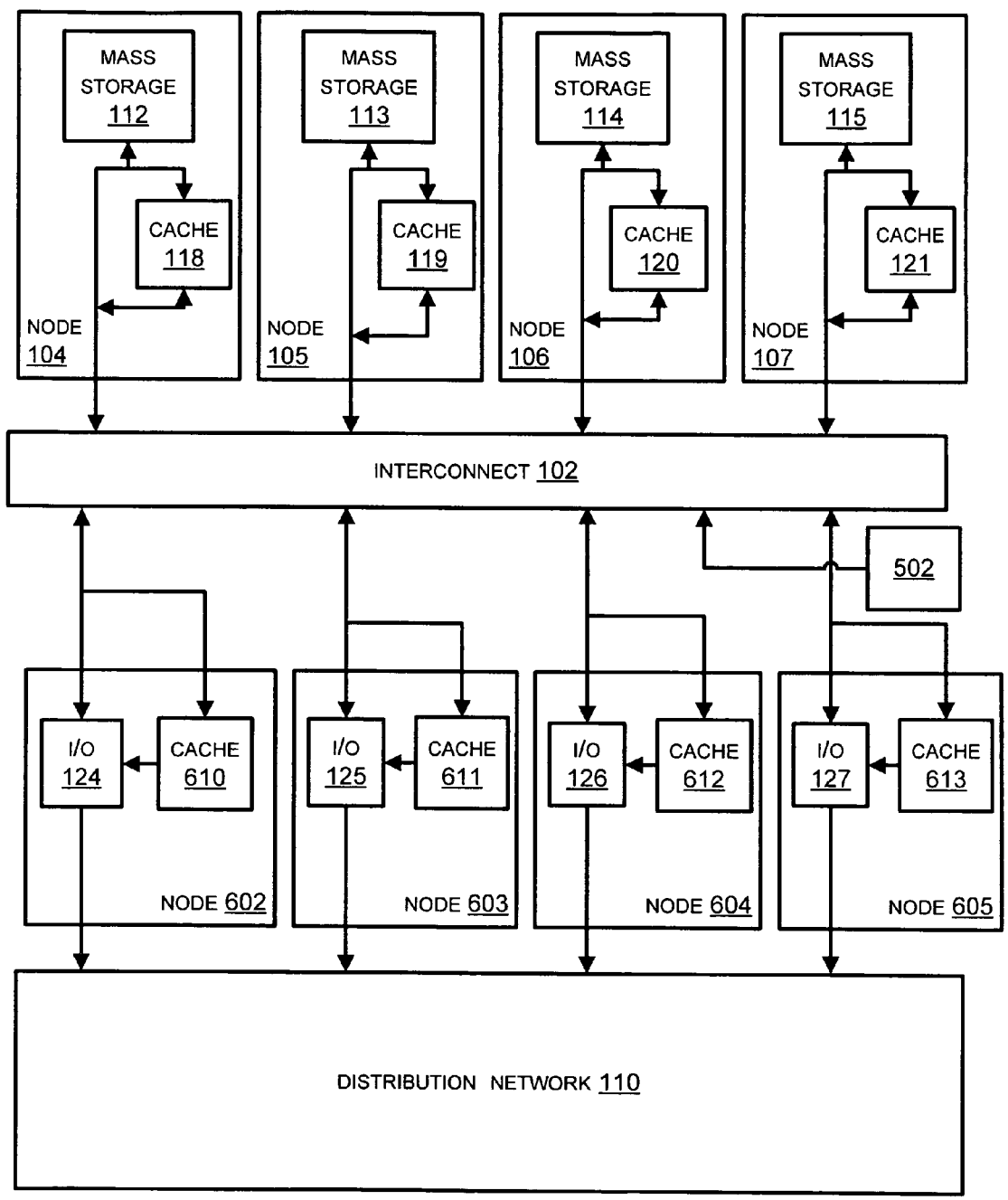
FIG. 6 is a block diagram of another embodiment of a data processing system including cache management.

FIG. 6 is a block diagram of another embodiment of a data processing system including cache management. Storage nodes 104-107 comprise mass storage and cache. In particular, storage node 104 comprises mass storage 112 and cache 118, storage node 105 comprises mass storage 113 and cache 119, storage node 106 comprises mass storage 114 and cache 120, and storage node 107 comprises mass storage 115 and cache 121.

I/O nodes 602-605 comprise I/O functionality and cache. In particular, I/O node 602 comprises I/O 124 and cache 610, I/O node 603 comprises I/O 125 and cache 611, I/O node 604 comprises I/O 126 and cache 612, and I/O node 605 comprises I/O 127 and cache 613. The cache 118-121 may be referred to as storage cache, and the cache 610-613 may be referred to as I/O cache. The interconnect 102 is coupled to access information of the storage cache 118-121. The I/O cache 610-613 is coupled to receive and store information provided to the I/O nodes 602-605 via the interconnect 102. A particular one of the I/O 124-127 may access information of the cache 118-121, and information of the cache comprised by the I/O node to which the I/O belongs. For example, I/O 124 may access information of the cache 118-121, and further may access information of the cache 610. The information stored by the cache of an I/O node may be determined according to previous, present, and predicted information distributed by the I/O of that node. It is also possible that the information stored by an I/O cache may be determined by information distributed by I/O nodes other than the I/O node comprising the cache (for example, where multiple I/O nodes cooperate to distribute a related set of information). The cache manager 502 may operate via the interconnect 102 to at least partially affect the information stored by the I/O cache 610-

613. In other words, the cache 118-121 and the I/O cache 610-613 may be operated to provide the benefits of a global, distributed cache to the I/O 124-127, while maintaining at least some of the benefits of local I/O caching.

Other systems may include couplings between the cache manager 502 and the I/O cache 610-613 that do not involve the interconnect 102. In such systems the cache manager 502 may influence the contents of the I/O cache 610-613 and/or storage cache 118-121 without communicating signals and/or information via the interconnect 102.

Figure 7:
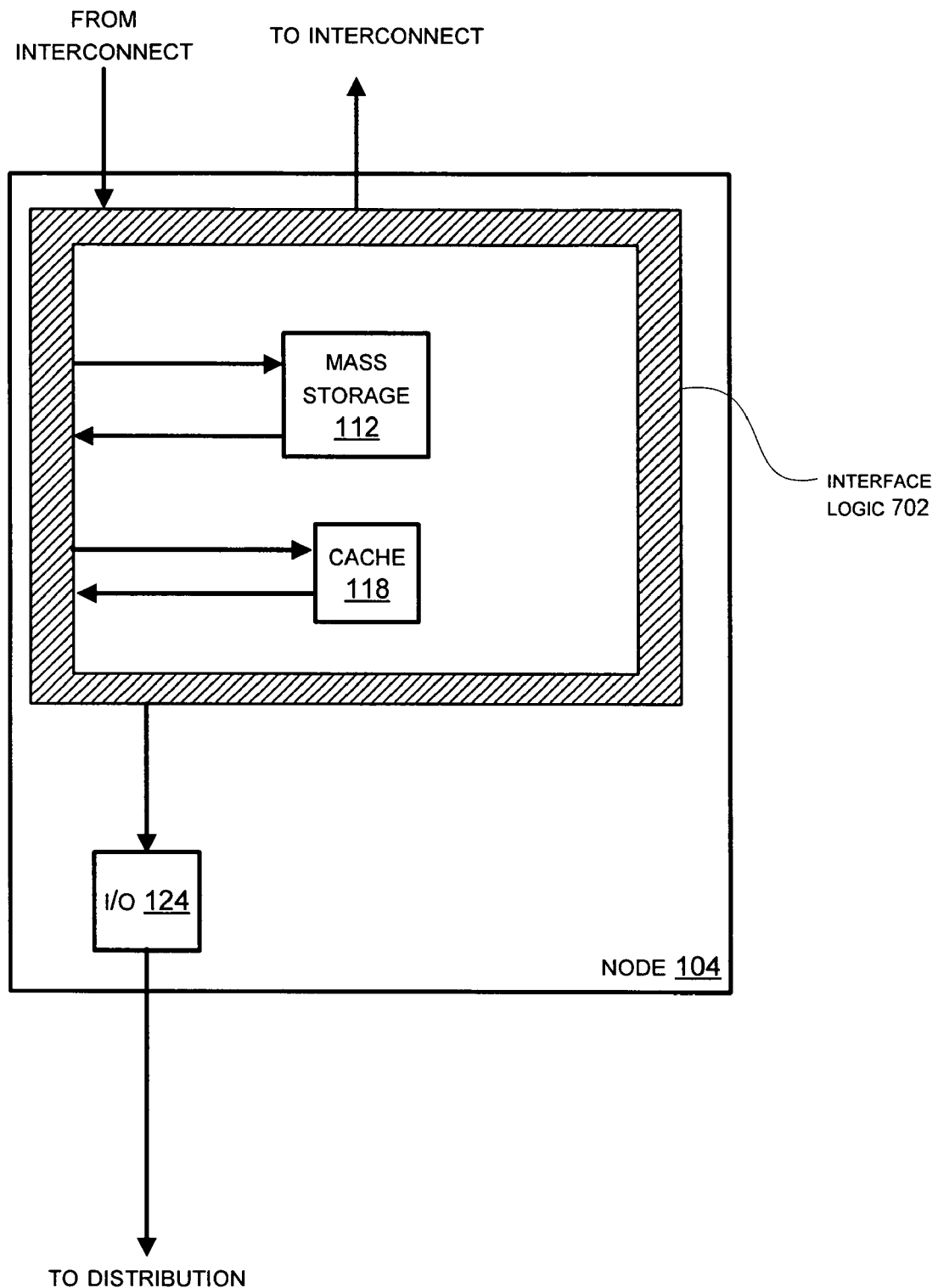
FIG. 7 is a block diagram of an embodiment of a node of a data processing system, including interface logic.

FIG. 7 is a block diagram of an embodiment of a node of a data processing system, including interface logic. The interface logic 702 is configured to receive signals from the interconnect 102 and to apply the signals from the interconnect 102 to affect the content of the cache 118 and/or mass storage 112. The interface logic 702 is further configured to receive signals from the mass storage 112 and to apply the signals from the mass storage 112 to affect the content of the cache 118. The interface logic 702 may be further configured to provide content from the cache 118 and mass storage 112 to the interconnect 102. The I/O logic 124 may be configured to cooperate with the interface logic 702 to retrieve content from the cache 118, mass storage 112, and/or interconnect 102. In systems where the I/O logic 124 is comprised by an I/O node (e.g. I/O node 602 of FIG. 6), the I/O logic 124 may be configured to cooperate with the interface logic of each storage node to retrieve via the interconnect information content from the cache and mass storage of each storage node.

Figure 8:
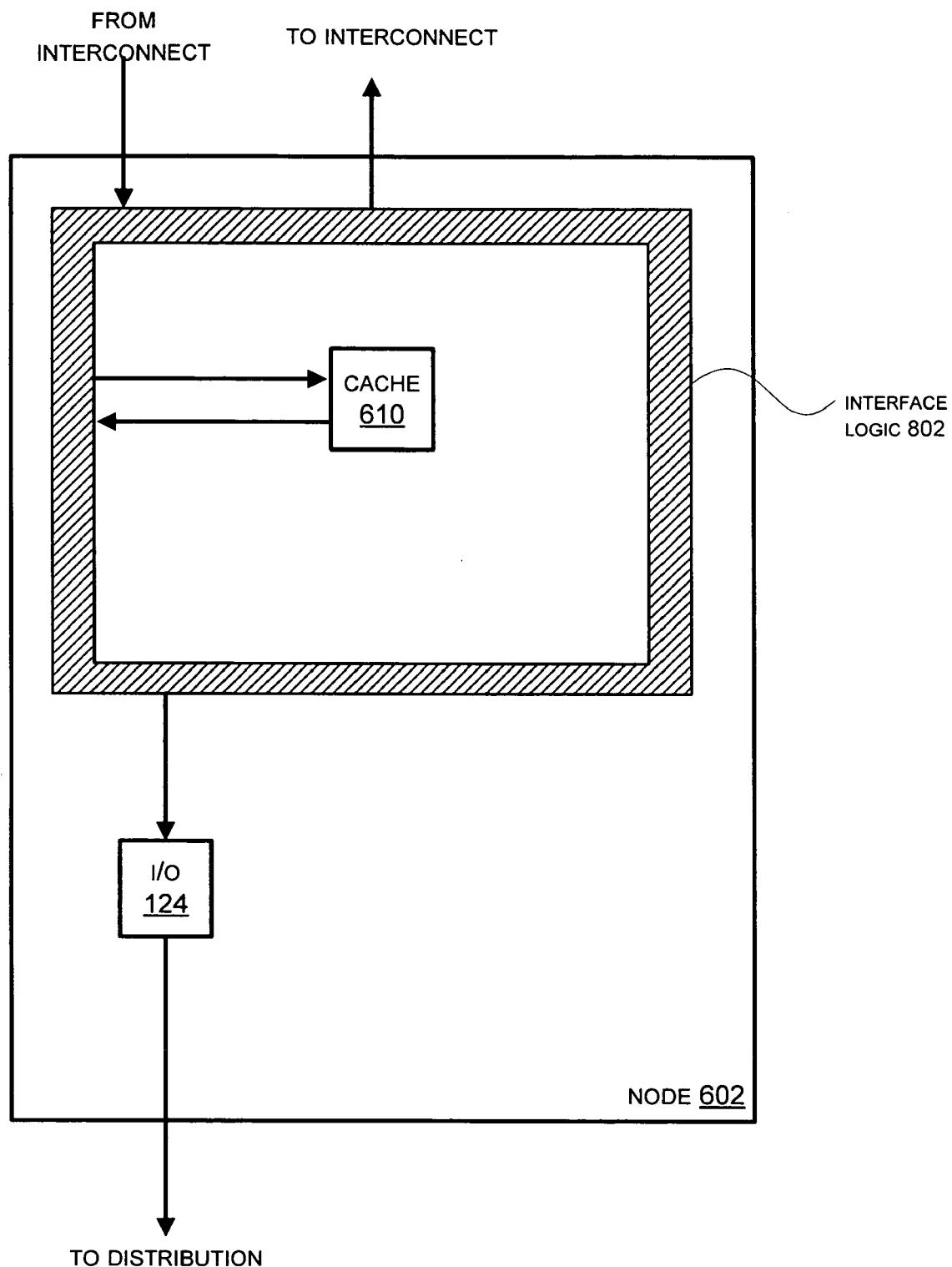
FIG. 8 is a block diagram of an embodiment of an I/O node of a data processing system, including interface logic.

FIG. 8 is a block diagram of an embodiment of an I/O node of a data processing system, including interface logic. The interface logic 802 is configured to receive signals from the interconnect 102 and to apply the signals from the interconnect 102 to affect the content of the cache 610. The interface logic 802 may be further configured to provide content from the cache 610 to the interconnect 102. The I/O logic 124 may be configured to cooperate with the interface logic 802 to retrieve content from the I/O cache 610, and from the cache and mass storage of various storage nodes and/or other I/O nodes.

Figure 9:
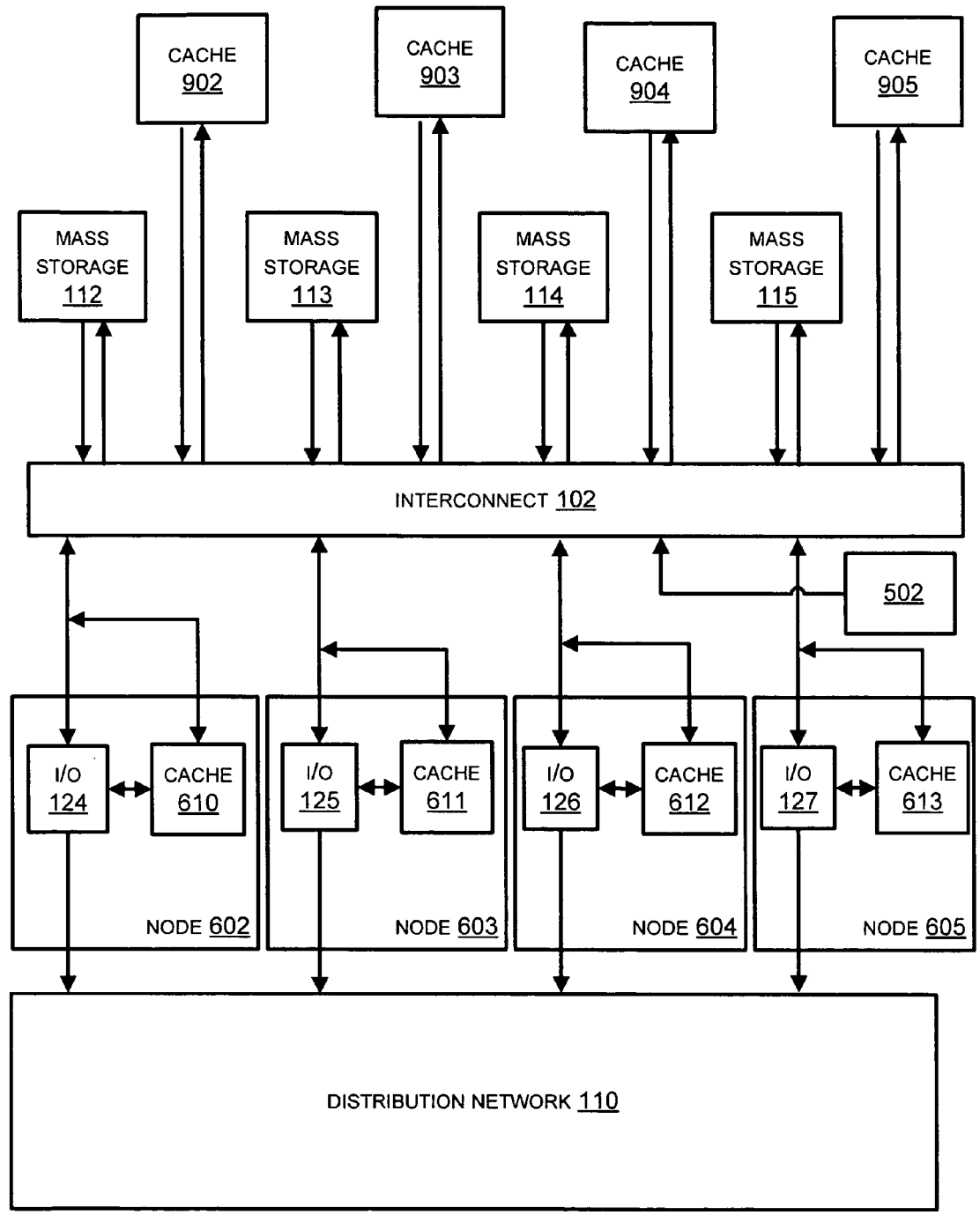
FIG. 9 is a block diagram of another embodiment of a data processing system including cache management.

FIG. 9 is a block diagram of another embodiment of a data processing system. The system comprises mass storage nodes 112-115, I/O nodes 602-605, and cache nodes 902-905. In this system I/O functionality, cache, and mass storage may each be added and removed independently of one another. Each cache node 902-905 may be configured to receive signals from the interconnect 102 and to apply the signals from the interconnect 102 to affect the content of the cache of that node. Each cache node 902-905 may be further configured to provide content from the cache of the node to the interconnect 102.

I/O nodes 602-605 comprise I/O functionality and, optionally, cache. The I/O nodes 602-605 are coupled to receive information provided via the interconnect 102. A particular I/O node 602-605 may access information of the cache nodes 902-905, the mass storage nodes 112-115, and (if the I/O node comprises a cache) information of the cache comprised by the I/O node to which the I/O belongs. For example, I/O node 602 may access information of the cache nodes 902-905, mass storage nodes 112-115, and further may access information of the cache 610. In some embodiments an I/O node may access information of the cache(s) of one or more other I/O nodes.

The information stored by the cache of any cache node may be determined according to previous, present, and predicted information distributed by any one or multiple ones of the I/O nodes 602-605. The cache manager 502 may operate via the interconnect 102 to affect the information stored by the cache nodes 902-905. Other systems may include couplings between the cache manager 502 and the cache nodes 902-905 that do not involve the interconnect 102. In such systems the cache manager 502 may influence the contents of the cache nodes 902-905 without communicating signals and/or information via the interconnect 102.

In some embodiments the cache manager 502 may also operate to at least partially affect the contents of the caches of the I/O nodes 602-605 according to the information distributed by various ones of the I/O nodes 602-605.

Various alternative arrangements include systems comprising greater or fewer storage and/or I/O and/or cache nodes, systems in which some storage nodes (or the cache and/or mass storage of the storage nodes) are unavailable or available on a limited basis to some I/O logic and/or I/O and/or cache nodes, and so on.

Elements of Nodes of a Hypercube

Figure 10:
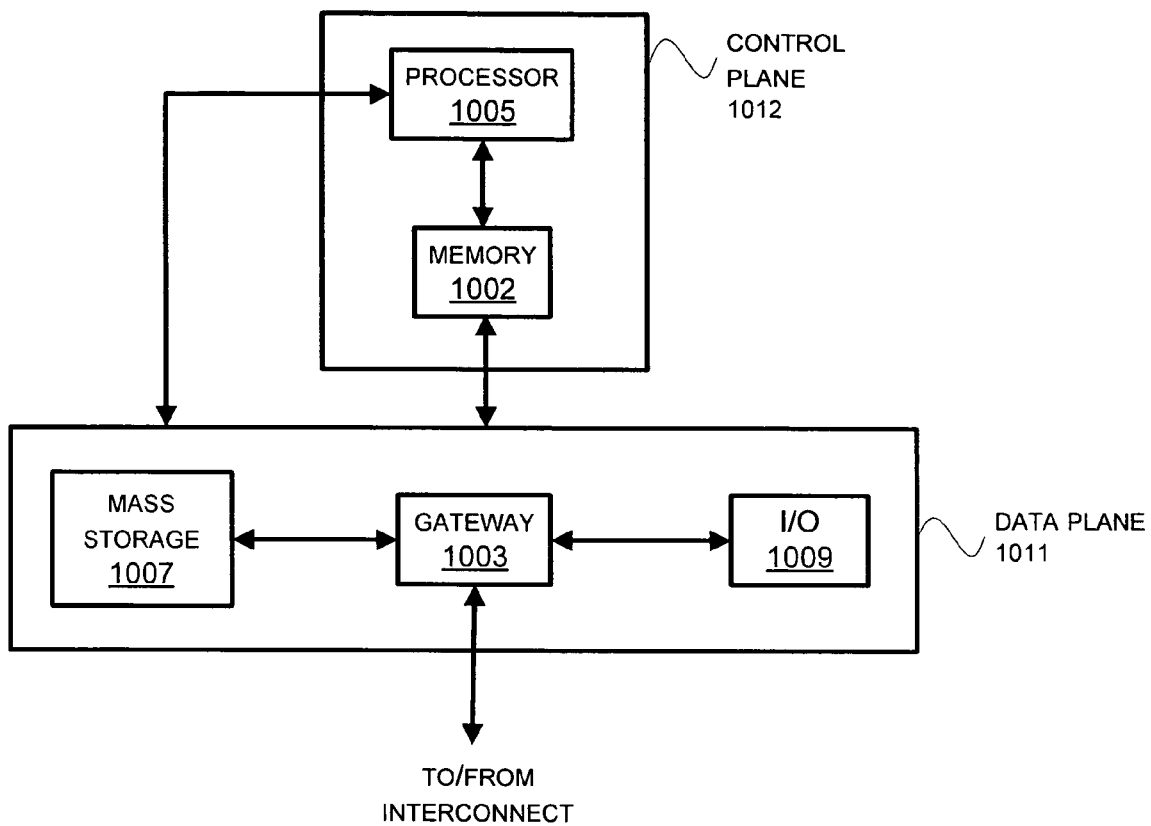
FIG. 10 is a block diagram of an embodiment comprising elements of nodes of a media distribution system.

FIG. 10 is a block diagram of an embodiment comprising elements of a node of a media distribution system. In some embodiment, for example as illustrated, the nodes may form a hypercube. A processor 1005 may use memory 1002 to store instructions and data. The processor 1005 and memory 1002 may be parts of a "control plane" that provides control information to direct the operation of the node. The memory 1002 may be unavailable to other nodes of the system and hence may be considered "local memory" of the processor 1005. The processor 1005 interacts with elements that functionally may be considered as a data plane 1011 of the node.

Data may enter the data plane 1011 from mass storage 1007 and/or the gateway 1003, which may provide memory and communication path(s) to and from other nodes. Data may be communicated to and from the data plane 1011 to and from other nodes via the gateway 1003. The gateway 1003 may comprise memory and the interface to communication path(s) to other nodes. The gateway 1003 may also interface to mass storage 1007 and I/O 1009. The gateway 1003 may also comprise other elements such as, for example, a processor(s) and/or internal busses, not shown.

The I/O logic 1009 may also communicate data to and from the data plane 1011. One example of I/O 1009 logic is an Intelligent Gigabit Ethernet subsystem (a.k.a. Intelligent GigE Card), which may perform functions such as data fetching, framing, and formatting for one or more protocol layers. An Intelligent GigE Card may comprise one or more embedded processors, apart from the central processor(s) 1005, to perform the data fetching, framing, and formatting for one or more protocol layers. In prior art systems, such fetching, framing, and/or formatting functions may be performed in whole in part by the system operating logic, using the processor(s) 1005.

Figure 12:
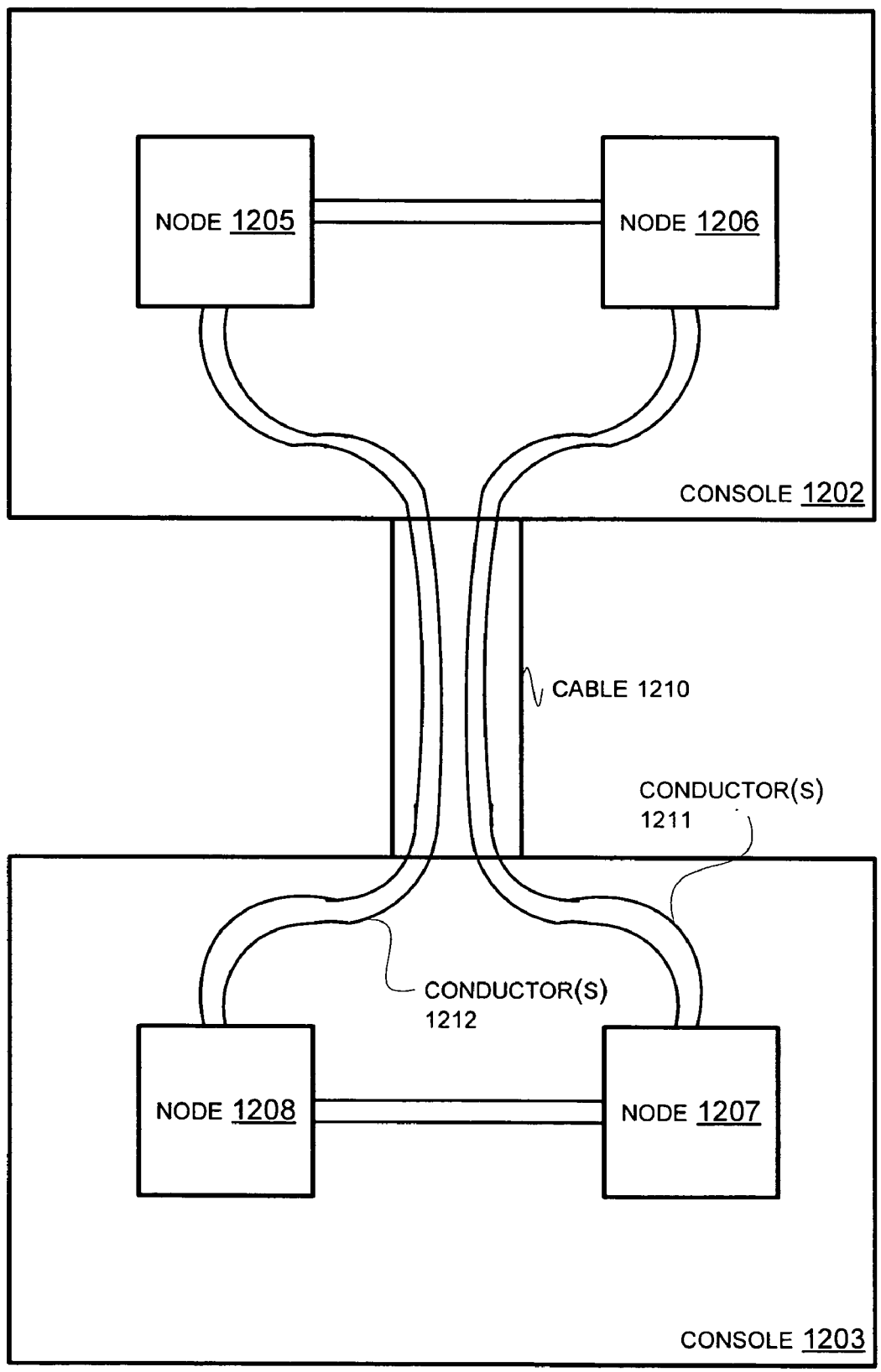
FIG. 12 is a block diagram of an embodiment of an interconnection of consoles of a media distribution system.

The communication path(s) to nodes of different consoles form part of the hypercube interconnect that provides high throughput communications among nodes. The communication path(s) among nodes of different consoles may comprise one or more connectors and/or cables to other data planes/nodes of the hypercube. FIG. 12, described later, illustrates one embodiment of interconnection between nodes in a hypercube.

Node Architecture

A node may comprise one or more processors 1005 and one or more gateways 1003 having data isolation from the processors 1005. The node may have exclusive use of the processors 1005, or may share one or more of the processors 1005 with another node (e.g. another node within the same console). The gateway 1003 may act as an interface between mass storage 1007, the I/O 1009, and one or more interconnects to other nodes. The processor 1005 may have associated local memory 1002. The local memory 1002 may consist of "main memory" and/or one or more local caches. The processor 1005 and the local memory 1002 may interface, at least in part, using a data bus. The processor 1005 may be isolated from the data plane in the sense that the processor 1005 may manage the streaming of data to I/O 1009 from the mass storage 1007 and/or other nodes via the gateway 1003, without reading or writing the data that is streamed. To accomplish this, the processor may specify storage locations/addresses of data blocks to stream to I/O 1009. The processor 1005 may be capable of accessing data of the mass storage 1007, gateway 1003, and/or I/O interface 1009 under specific conditions. However, the system may include logic to enable the processor to manage the communication of information between the mass storage 1007 and/or other nodes and the I/O 1009 without communicating that information to the processor 1005 and/or processor memory 1002. In other words, the system may include logic to enable the processor 1005 to supervise communication of data along the data plane, without reading or writing the data that is communicated.

The mass storage 1007 may consist of one or more disks or disk arrays as well as one or more disk/disk array controllers.

The processor local memory 1002 may comprise video server/video pump logic. The video server/video pump logic, when applied to the processor, may cause the streaming of programming content from the mass storage 1007 and/or other nodes, through the gateway 1003, to the I/O 1009, from which point the programming content is communicated as a stream to a distribution system, such as a cable television plant.

The processor 1005 may provide control information to the mass storage 1007, I/O 1009, and/or the gateway 1003. The control information may direct these components to stream programming content (e.g. audio/visual data) to the I/O 1009. The programming content may be located on mass storage associated with the same or some other node, or it may be located in the gateway memory (e.g. cache memory) associated with the same or some other node.

Programming content may be read from mass storage 1007 into the gateway 1003 memory (e.g. using direct memory access a.k.a. DMA), and from there it may be provided (e.g. again using DMA) to the I/O 1009. Programming content located on the mass storage of some other node may be read from the mass storage of the other node and may flow through the gateway of the other node and through the hypercube interconnect. From there the programming content may be read into the gateway memory of the node that is streaming the content. From the gateway memory of the streaming node, the programming content may be provided to the I/O 1009.

The processor 1005 and processor local memory 1002 may collectively form a control plane 1012 providing control information to the data plane 1011, which is responsible for storing, retrieving, and streaming content data.

The processor 1005 may be isolated from the data plane 1011, and thus does not read or write actual programming content to or from the mass storage 1007 or gateway 1003 while supervising the streaming of audio/visual information from mass storage 1007/cache of the node and/or other nodes to the I/O interface 1009. Instead, the processor 1005 may specify data addresses and control structures and instructions which direct the operation of the data plane 1011 in accomplishing the streaming of programming content. Specification of data addresses and control information may result in the mass storage 1007 controller and/or another node providing programming content to the gateway 1003 memory, from which the programming content is provided to the I/O 1009 controller for framing and formatting for streaming. The processor 1005 may act according to instructions of video server/data pump logic. The video server/data pump logic may reside in processor local memory 1002 and may drive the streaming process as previously described.

The processor 1005 may be coupled to the data plane 1011 via one or more busses that provide control information to components of the data plane 1011. The processor 1005 may signal mass storage 1007 and/or I/O 1009 and/or gateway 1003 using the busses, and/or the processor 1005 may write commands to its local memory 1002 that the mass storage 1007 and/or I/O 1009 and/or gateway 1003 may access using the busses.

In some implementations, as previously described, the system may include logic to cause mass storage and gateway memory (e.g. cache memory) of two or more nodes to appear to the processors as a single mass storage volume and cache memory, respectively. Logic may be present to determine whether one or more addresses referenced by one or more local processors refers to data stored by non-local gateway memory (non-local cache) and/or non-local mass storage, and if so, to retrieve the data from the non-local cache and/or non-local mass storage.

Nodes within a single console may communicate stream data between themselves primarily via gateways of the nodes, rather than by way of the processor pool and/or processor memory that the nodes may share. In other words, the gateways may be used to communicate stream information between nodes even when the nodes are part of the same console and share a processor pool.

Elements of Nodes of a Console of a Media Distribution System

Figure 11:
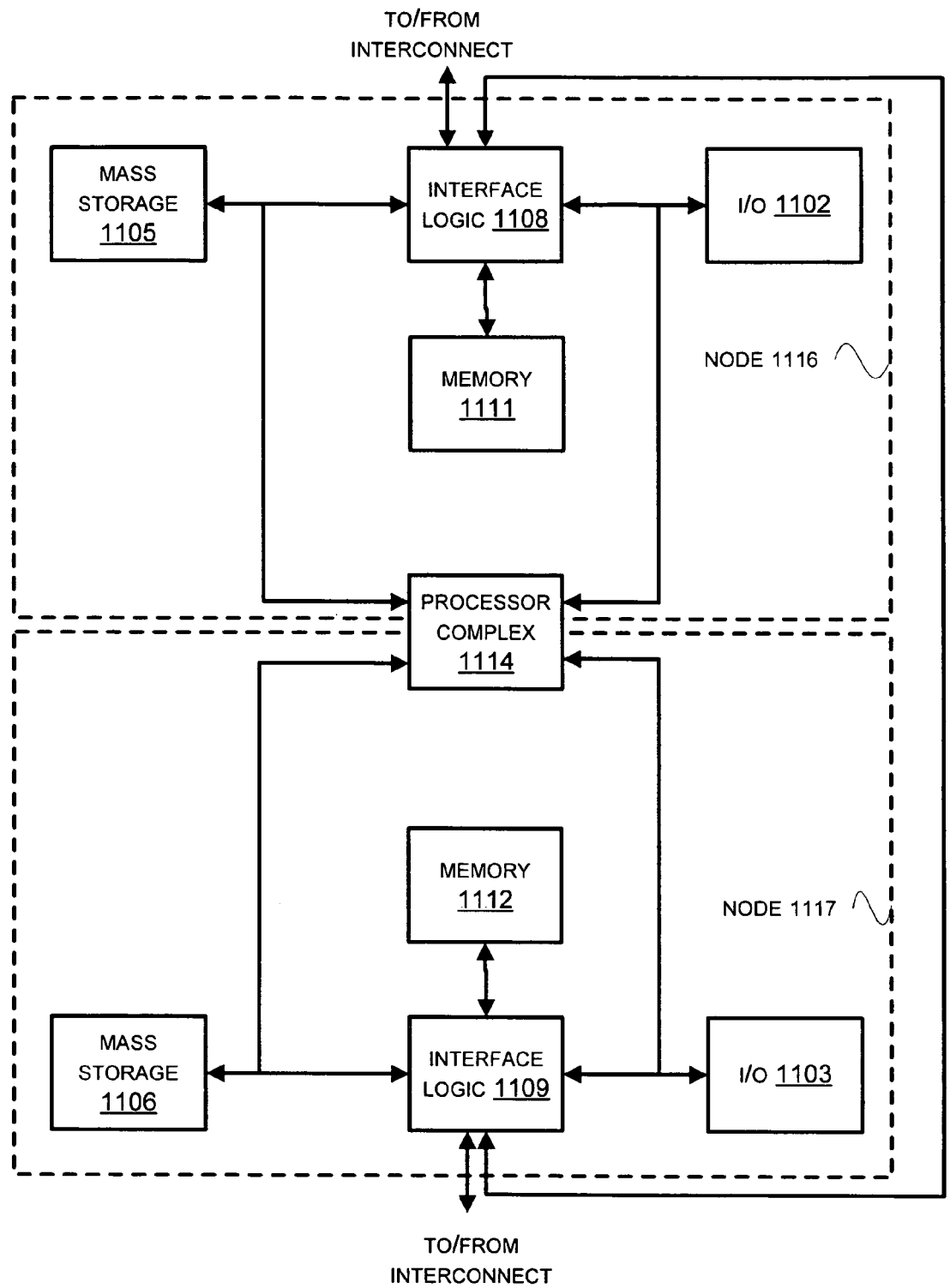
FIG. 11 is a block diagram of an embodiment comprising elements of nodes within a console of a media distribution system.

FIG. 11 is a block diagram of an embodiment comprising elements of nodes within a console of a media distribution system. In general, a console may comprise any number of nodes. Each node 116 and 117 comprises elements of the processor complex 1114 (e.g. a shared and/or partially shared processor pool) and elements of a data plane. As previously discussed, the data plane elements perform fetching and streaming of programming content under the direction of the processor(s) 1114.

For node 1116, the data plane elements comprise mass storage 1105, a gateway comprising interface logic 1108 and memory 1111, and I/O interface(s) 1102.

For node 1117, the data plane elements comprise mass storage 1106, a gateway comprising interface logic 1109 and memory 1112, and I/O interface(s) 1103.

Console Architecture

In one embodiment, a console may comprise a first node 1116 and a second node 1117. In other embodiments the consoles may comprise different numbers of nodes. There may typically be at least two nodes in a console. In some situations a console may comprise a single node (e.g. a single functioning node). The first node 1116 includes mass storage 1105, one or more first media output ports 1102, a first gateway including interface logic 1108 and gateway memory 1111, and a processor or processors within a processor complex 1114. The second node 1117 includes a second mass storage 1106, one or more second media output ports 1103, a second gateway including interface logic 1109 and gateway memory 1112, and one or more processors within a processor complex 1114. Elements of the data planes may have data isolation from the processor complex 1114, such that streaming of programming content is directed by the processors 1114 without the processors 114 reading or writing the programming content.

The gateways each comprise a gateway memory 1111 1112 and a gateway interface 1108 1109. Communication among nodes within the console, and with nodes outside of the console, may be accomplished via the interconnect which may be accessed via the gateways.

The system may comprise logic to cause mass storage and gateway memory of nodes within a console to appear to the processors 1114 as a single mass storage volume and cache memory, respectively. More generally, the system may comprise logic (e.g. operating system logic) to cause mass storage and gateway memory of some or all nodes to appear to the processors 1114 as a single mass storage volume and cache memory, respectively. Large media files may be striped across storage media of multiple nodes, but may appear to the processors as a single contiguous file (a.k.a. a single contiguous range of storage addresses). Programming content for streaming may be cached in the gateway memory of the node that is streaming the programming content, or in gateway memory of other nodes. The logic to determine where caching of program content takes place may reside at the node or nodes where the content is stored, at other nodes, or via a global operating system facility, for example. The processor complex 1114 may direct the streaming of programming content without knowledge of whether the programming content is stored on the local node's mass storage, on the mass storage of other nodes within the same console, on the mass storage of nodes not within the same console, or in gateway memory of other nodes of the same or different consoles.

The system, and/or each node, and/or each console may comprise logic to determine whether one or more addresses referenced by one or more local processors refers to data stored by gateway memory of the same node or another node. In some embodiments, the logic to determine if a block of data should be retrieved from mass storage or from cache is made by the node or nodes where the block is stored. If storage is provided by the gateway memory of another node, the logic (either of the requesting node and/or of the storing node, depending on the embodiment) may act to retrieve the data from the gateway memory of the other node. In some embodiments, this logic may be present at least in part within the gateway component. The system may include logic to enable the processors to cause the communication of audio/visual stream blocks from the mass storage of the node and/or the mass storage of another node to the I/O interface, without communicating contents of the blocks to the processor or the processor local memories.

Interconnection of Consoles of a Media Distribution System

FIG. 12 is a block diagram of an embodiment of an interconnection of consoles of a media distribution system. Nodes 1205 1206 of console 1202 communicate via an intra-console connection, as discussed above. Nodes 1208 1207 of console 1203 similarly communicate via intra-console connection.

Node 1207 communicates with node 1206 (its "partner node" in the other console) via independent communication channel 1211. Nodes 1205 and 1208 communicate via independent communication channel 1212. The independent channels may, in some embodiments, comprise two physically distinct and independent communication paths. These in turn may comprise two physically distinct paths providing full-duplex communication. Each path of the full-duplex communication may in turn comprise two physically distinct paths in order to provide differential (e.g. positive and negative voltage) communication. Thus, in some embodiments an interconnection cable between consoles may connect two pairs of partner nodes in the consoles, and may comprise sixteen or more physically distinct communication paths.

Nodes within a console may be coupled to a console interface comprising independent physical communication channels to multiple nodes of other consoles. In one embodiment, consoles may be connected by a cable comprising four independent physical communication channels, with the first node having two independent physical communication paths to a partner node in another console, and the second node having two independent physical paths to a partner node in the other console. Other embodiments may use different numbers of independent physical communication channels and/or independent physical paths between nodes.

Hypercube Architecture

The nodes 1205-1208 of a media distribution system may be interconnected to form a hypercube, and the nodes may be organized into console units 1202 1203. Nodes in different consoles may communicate by way of a hypercube interconnect cable 1210 comprising independent communication paths 1211 1212. Gateway components of the nodes may provide an interface for communication between nodes of the same and different consoles.

Although illustrated with two nodes apiece, other embodiments may comprise consoles with more or fewer nodes. Although each console is illustrated as comprising a same number of nodes, in some cases consoles within a hypercube may have different numbers of nodes. In general, nodes may have multiple partner nodes (nodes to which they have a direct physical connection) in other consoles.

In general, N nodes in a first console may communicate with N nodes in a second console by way of X independent communication channels, where $N>=1$. An independent communication channel is one that does not depend on the timing or signaling of another channel, e.g. two wires that are part of the same bus are not independent. In one embodiment, there may be $X=2N$ independent communication paths between a pair of consoles, where N is the number of nodes in each console. In other words, each node in a console may communicate with its partner node in another console via two independent physical communication paths. Each path in turn may comprise multiple wires for implementing full duplex and differential signaling. Other embodiments may employ more than two independent physical communication paths between nodes and their partner nodes in other consoles.

Independent communication channels between a pair of consoles may be packaged within a single cable. For example, in some embodiments two independent communication channels (each comprising two independent physical paths) may be provided in a single cable between console 1202 and console 1203.

As previously described, nodes within the same console may communicate via an intra-console hypercube interconnect, utilizing the same gateway interface and protocols as are used when the nodes communicate with nodes in other consoles via the external interconnect. The nodes within each console may share a processor pool. The system may include logic to cause mass storage and cache memory of the nodes of the same and different consoles to appear to processors of each console as a single mass storage volume and cache memory, respectively.

Video Streaming Process

In one embodiment, a name or names is provided to the system, the name(s) representing one or more physical stream files. The system directs video pump logic to begin streaming the file(s).

The video pump specifies addresses for blocks of data to stream and generally manages the process of streaming the file(s).

Data blocks of the file(s) to stream may be striped or otherwise divided across storage volumes of multiple nodes of the hypercube. Block addresses specified by the video pump may refer to blocks stored on any node of the hypercube.

Blocks may be cached in the memory of the gateway of the node on which they are stored. Thus, a request from another node for a file block may be provided via the hypercube interconnect either from mass storage of the storing node, or, if the block has been previously cached, from gateway memory of the storing node. If a block is stored by the streaming node, the block may be provided to the I/O interface without crossing the hypercube interconnect.

Blocks are read into the gateway memory of the node that is streaming the file. From the gateway memory the blocks are provided to the I/O interface for streaming. The I/O interface formats the blocks according to the streaming protocol(s) used and paces the communication of the data stream over the distribution system. Few if any cycles of the node processor(s) are expended reading, writing, formatting, and streaming the data blocks.

Those having skill in the art may appreciate that there are various vehicles by which processes and/or systems described herein can be effected (e.g., hardware, software, and/or firmware), and that the preferred vehicle may vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle may be deployed and the specific concerns (e.g., speed, flexibility, or predictability) of the implementer, any of which may vary. Those skilled in the art may recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it may be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art may recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art may appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art may recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art may recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A media server comprising:
  a plurality of nodes each comprising a gateway, each gateway providing memory and communication of data between mass storage and I/O ports of a node;
  each node utilizing one or more central processor and processor memory; and
  the media server comprising non-transitory machine readable media and/or memory devices embodying logic to enable the central processor of any one node of the plurality of nodes to manage the streaming of data to the I/O ports of the node from the mass storage of the node without reading or writing the data that is streamed, by specifying addresses of data blocks to stream to the I/O ports, thus enabling the central processor to manage the streaming of the data between the mass storage and the I/O ports without communicating the data to the central processor or processor memory.

2. The media server of claim 1, further comprising:
non-transitory machine readable media and/or memory devices embodying logic to cause mass storage and gateway memory of the at least two nodes to appear to the processors as a single mass storage volume and cache memory, respectively.

3. The media server of claim 1, further comprising:
non-transitory machine readable media and/or memory devices embodying logic to determine whether one or more addresses of data to stream refers to data stored by non-local gateway memory, and if so, to retrieve the data from the non-local gateway memory to the node that is streaming the data.

4. The media server of claim 1, further comprising:
the first and second nodes comprised by a single console and comprising interfaces to nodes of other consoles.

5. The media server of claim 4, further comprising:
nodes within the single console communicating stream data between themselves primarily via gateways of the nodes within the single console.

6. The media server of claim 1, further comprising:
the first and second nodes coupled to a console interface comprising independent physical communication channels to multiple nodes of other consoles.

7. The media server of claim 6, further comprising:
the first and second nodes coupled to nodes of another console by a cable comprising four independent physical communication channels, with the first node having two independent physical communication channels to a first node in another console, and the second node having two independent physical communication channels to a second node in the another console.

8. The media server of claim 6, further comprising:
multiple independent communication channels in each cable connecting two consoles, a pair of independent communication channels connecting each node in a first console with a partner node in a second console.

9. A node of a multi-processor system comprising:
mass storage;
at least one central processor;
processor memory providing storage of data read from or written to the mass storage by the processor;
an I/O interface; and
a media server comprising non-transitory machine readable media and/or memory devices embodying logic to enable the processor to manage the streaming of data from the mass storage to the I/O interface from the mass storage without reading or writing the data that is streamed, by specifying addresses of data blocks to stream to the I/O interface, thus enabling the processor to manage the streaming of the data between the mass storage and the I/O interface without communicating the data to the processor or processor memory 10. The node of a multi-processor system of claim 9, further comprising:
at least one gateway providing communication of stream data between the mass storage, the I/O interface, and an interconnect to other nodes of the multi-processor system; and
non-transitory machine readable media and/or memory devices embodying logic to enable the processor to manage the streaming of data from the mass storage to the I/O interface via the gateway without communicating the data between the processor and any of the mass storage, gateway, or I/O interface.

11. The node of a multi-processor system of claim 9, further comprising:
non-transitory machine readable media and/or memory devices embodying logic to enable the processor to cause the communication of data stream blocks from the mass storage of the node and/or the mass storage of another node to the I/O interface, without communicating contents of the blocks to the processor or the processor memory.

* * * * *